United States Patent [19]
Berson

[11] Patent Number: 5,514,860
[45] Date of Patent: May 7, 1996

[54] DOCUMENT AUTHENTICATION SYSTEM UTILIZING A TRANSPARENT LABEL

[75] Inventor: William Berson, Westport, Conn.

[73] Assignee: Pitney Bowes Inc., Stamford, Conn.

[21] Appl. No.: 318,061

[22] Filed: Oct. 3, 1994

Related U.S. Application Data

[63] Continuation of Ser. No. 90,671, May 24, 1993, abandoned.

[51] Int. Cl.$^6$ ..................................................... G06K 7/10
[52] U.S. Cl. ........................ 235/468; 235/491; 283/92; 283/109; 283/901
[58] Field of Search .................................. 235/462, 468, 235/491, 488; 283/92, 94, 109, 114, 901

[56] References Cited

U.S. PATENT DOCUMENTS

| | | | |
|---|---|---|---|
| 3,640,009 | 2/1972 | Komiyama. | |
| 3,760,161 | 9/1973 | Lohne et al. | 235/468 |
| 4,151,667 | 5/1979 | Idelson | 283/92 |
| 4,257,677 | 3/1981 | Anderson. | |
| 4,538,059 | 8/1985 | Rudland | 235/468 |
| 4,889,365 | 12/1989 | Chouinard | 283/70 |
| 4,889,367 | 12/1989 | Miller | 235/468 |
| 4,983,817 | 1/1991 | Dolash et al. | 235/462 |
| 5,042,842 | 8/1991 | Green et al. | 283/101 |
| 5,078,828 | 1/1992 | Marglin | 283/92 |
| 5,206,490 | 4/1993 | Petigrew et al. | 235/462 |
| 5,337,362 | 8/1994 | Wang et al. | 235/462 |

FOREIGN PATENT DOCUMENTS

| | | | |
|---|---|---|---|
| 2635486 | 2/1990 | France. | |
| 4022822 | 10/1991 | Germany. | |
| 116286 | 5/1988 | Japan | 235/462 |
| 182988 | 8/1991 | Japan | 235/491 |
| 186494 | 7/1992 | Japan | 235/491 |
| 2141665 | 1/1985 | United Kingdom. | |

*Primary Examiner*—F. L. Evans
*Attorney, Agent, or Firm*—Ronald Reichman; Melvin J. Scolnick

[57] ABSTRACT

This invention relates to a document authentication concept wherein a transparent tape having encoded text thereon is applied to the document. The encoded text printed on the transparent tape is printed with invisible ink so that the message thereon is not visible to the unaided eye. Preferably, the ink is visible in the infrared range. With such a combination, the authentication medium can be applied to a document that has a predetermined format so that the tape can be placed over a portion of the text and the latter will still be readable.

5 Claims, 2 Drawing Sheets

5,514,860

DOCUMENT AUTHENTICATION SYSTEM UTILIZING A TRANSPARENT LABEL

This is a continuation of application Ser. No. 08/090,671 filed on May 24, 1993, now abandoned.

BACKGROUND OF THE INVENTION

There are many different types of documents issued by government agencies that authorize the holder of such documents to perform authorized tasks or grant rights to the holder of such a document. Examples of such documents are driver's licenses, passports, entry access badges, identification cards and the like. In issuing such documents, it is desirable to have them of a convenient size, while including information necessary for identifying the holder and the rights conferred. With these two requirements, documents issued by government agencies not only will have a defined format, but the textual information printed thereon is dense, thereby leaving little or no room for any additional information to be printed thereon.

A problem frequently encountered by government officials is the forging of government issued documents. With the advent of computers and refined printers that are available at a relatively low cost, the incidence of forgery has proliferated. Although there are processes where coatings are applied to documents to prevent copying, this does not end with the problem of forgery. Various schemes have been proposed to provide security to government issued documents so as to inhibit forgeries of such documents. One such scheme is to use encryption so that a code can be derived that is based upon the information on the face of the government issued document. Unfortunately, because of the limited space normally available in such documents, such a scheme has proven unattainable. Clearly, it would be advantageous to provide a scheme for imparting security to a government issued document that would overcome the inhabitations caused by the predetermined size and defined format of such documents. Also, it would be advantageous to be able to carry hidden encrypted information and in determining authenticity to of the document.

SUMMARY OF THE INVENTION

A scheme has been devised whereby government issued documents can have encrypted or encoded data thereon without interfering with the format of the document. The encoded or encrypted data is printed on a transparent tape with invisible ink. The ink becomes visible when exposed to either ultra violet light or infra-red light depending upon the dyes in the invisible ink. In preparing the label, the data on the document is scanned by a reader (scanner), and the information derived therefrom is encoded. A code is then devised to be printed upon the transparent label, and is done so with invisible ink. The transparent label is then applied to the document and because of the use of the invisible ink, one can read the text covered by the transparent tape.

When one wishes to determine the authenticity of the document, that person is provide with a device that will direct light of appropriate wavelength onto the label so that the ink becomes visible. The device will also have a decoding capability so that the operator can determine if the government document is genuine and the holder of the document is the person to whom the document was issued.

DETAILED DESCRIPTION OF THE PREFERRED EMBODIMENTS

This invention is concerned with the verification of government issued documents such as driver's licenses, passports, entry passes, identification cards and the like. The invention is described in conjunction with a driver's license, but it will be appreciated that the principles of the invention can be applied to other types of documents, whether the same are governmental or industrial issued documents, so long as the documents are for the purpose of identifying a right or privilege to which the issuer thereof is entitled.

Figure 1:
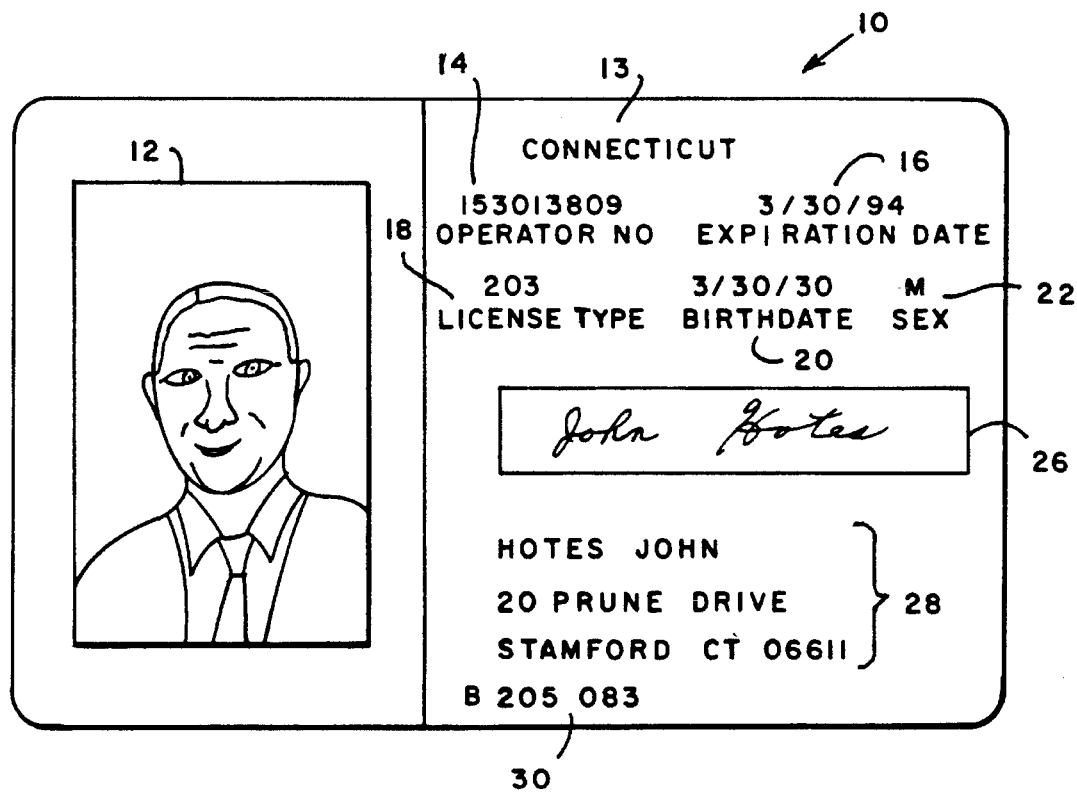
FIG. 1 is a plan view of a typical drivers license.
Figure 2:
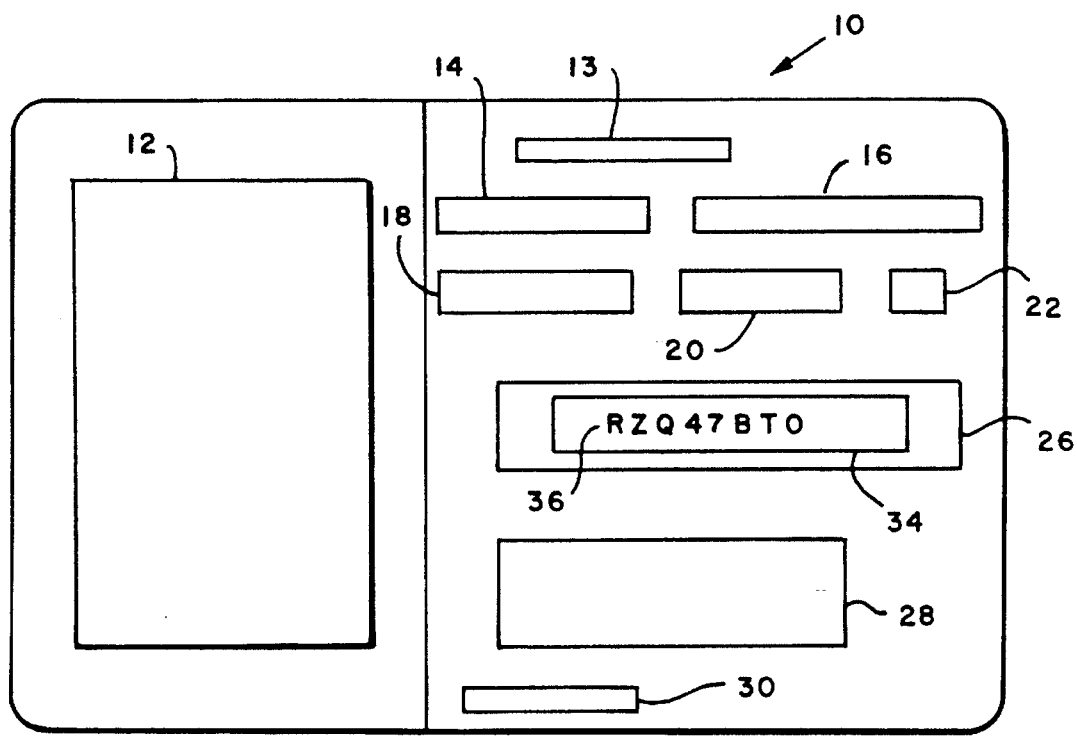
FIG. 2 is a view similar to FIG. 1 showing a label with data printed thereon which is attached to drivers license of FIG. 1.

With reference initially to FIG. 1, a document 10 in the form of a driver's license is shown having a photograph 12 of the person to whom the license was issued. The document 10 can be made of a single layer, or sheet, or a plurality of layers that are laminated together. A document composed of a single layer or multiple layers in this specification, including the claims, will be referred to collectively as a sheet. The driver's license also contains other data such as the state in which the license has been issued 13, the operator number 14, the expiration date 16, the license type 18, the birth date of the recipient 20, the gender 22 of the recipient, the name of the recipient 26, the address of the recipient 28 and issuer's identification data 30. It will be noted that the driver's license has a dense data field for the items that were just referenced. As such, it would be difficult to place additional information on the face thereof, as it is necessary that the document 10 be of convenient size. As a consequence, it is within the contemplation of this invention to provide a transparent label 34 having encoded data 36 printed thereon, as shown in FIG. 2 that will have correspondence to the data printed on the document 10. The encoded data 36 can include encrypted data, a bar code, or any other convenient format. As shown, the encoded message 36 is in the form of alpha-numerics. The label 34 is made of a transparent polymeric material such as polyvinyl acetate, polyethylene, polyterephthalate and the like and the ink with which the data 36 is printed is an invisible ink which becomes visible upon exposure to either ultraviolet light or light in the infrared region. Although the transparent label 34 can be made of a number of materials and the inks can be any of a number of commercially available inks, it is necessary that the materials chosen must be compatible with one another. By invisible ink is any ink that is not visible to the unaided eye or one that is transparent. Reference can be had to U.S. Pat. No. 5,093,147 for an example of an invisible ink responsive to infra-red light.

Invisible inks are commercially available from a member of suppliers such as Shannon Luminous Materials of Santa Ana, Calif., American Ultraviolet Company of Murray Hills, N.J., American Coding and Marking Ink Company of Plainfield, N.J. and U.V.P. Ink of San Gabriel, Calif.

Figure 3:
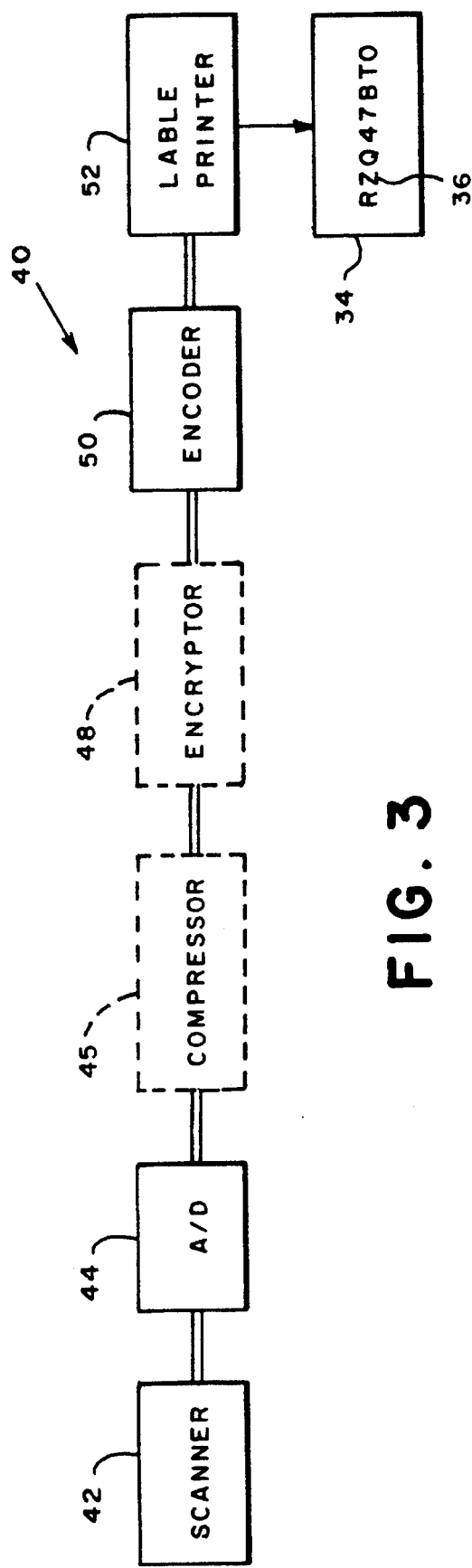
FIG. 3 is functional block diagram of a device for printing data on a label.

With reference to FIG. 3, a device 40 is shown whereby the label 34 can be printed with the appropriate data. The device includes a scanner 42 that scans the data on the driver's license 10 that is to be used for preparing the encoded data message 36 so that there is a correspondence between the data on the driver's license and the data represented by the encoded message 36. The operator number 14, the expiration date 16, the operator's name 26 and the operator's address or any combination thereof can be used as data for the encoded message 36. In addition, the photograph 12 can be scanned. An example of a code that could be used on label 34 is the PDF 417 code provided by Symbol Technology Inc. With such scanning an encoded message would be printed upon the label 34 which upon decoding would reproduce the photograph 12. Needless to say, the message 36 need not be encoded, but may simply duplicate data on the face of the document ID.

After the driver's license 10 is scanned, the data is sent to an A/D converter 44 to convert the received signal from analog to digital. Optionally, the data can then be compressed by a data compressor 45 if the amount of data is too voluminous. Thereafter, again optionally, the data can then be encrypted by an encryptor 48, following which the data would be encoded whether it is encrypted or not, by an encoder 50. After the data is encoded, a label printer will print the encoded message upon a transparent label 34 using invisible ink. The label printer will also include structure capable of applying an adhesive to the label. Preferably, the adhesive is applied to the side of the label where the encoded message 36 has been printed in invisible ink, so that the printed portion of the label will not be subjected to abrasion.

In an alternative embodiment, where the document 10 is formed from laminated layers with the last layer being transparent, the encoded message can be printed on such layer. Preferably, this message 36 is printed on the inside surface of the laminated layer.

Figure 4:
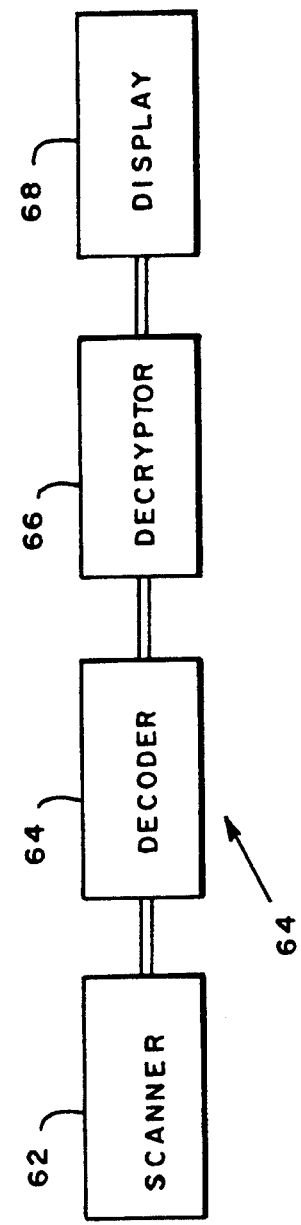
FIG. 4 is a functional block diagram of a device for reading data printed of the label of FIG. 2.

When a determination is to be made as to the authenticity of a document 10, the examiner will be provided with a device 60 such as that shown in FIG. 4. The device includes a scanner 62 that is capable of emitting light either in the infra-red region or ultra violet region, depending upon the invisible ink that had been applied to the transparent label 34. The scanner will be moved relative to the document to be scanned and light will be reflected from the document to the scanner to create data in the form of an image. The data from the scanner is then decoded by decoder 64, passed through decryptor 66, if the information had been encrypted, and subsequently the decoded message will be shown on a display 68. If the data on the display corresponds to the data on the document 10, the examiner will then have proof that the holder of the document 10 is the proper party. On the other hand, if there is no match, then the examiner would be alerted that he may be dealing with a forged document.

In another embodiment, the label 34 can be printed with a magnetic ink to form the message 36 rather than invisible ink and appropriate equipment could be provided for reading the magnetic message.

In addition to the data on the document 10, other information can be printed on the label to provide a hidden message. For example, information can be printed relative to past traffic violations or prior unlawful activities. Clearly, one would not desire such information be printed on the face of a document.

Thus, what has been shown and described is a concept whereby a document issued by the government or an industrial concern can be provided with means for authentication without interfering with the format of such a document.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A document having provision for determining authentication thereof, comprising:

a) a sheet having human visual text printed thereon;

b) a transparent label having information printed thereon that is attached to the sheet, said label being smaller than said sheet;

c) a bar code containing information derived from the visual text, said information is different from the visual text information, said bar code information is printed upon the transparent label with invisible ink to embed authentication of the document in a manner not visible to the unaided human eye; and and d) said bar code printed upon said transparent label has a correspondence to at least a portion of said text printed on said sheet wherein said bar code that is printed on said label has a predetermined form.

2. In a method of providing a data bearing document having provision for authentication thereon, the steps comprising:

a) scanning a document to create a bar code; to derive data therefrom;

b) printing a bar code containing at least a portion of the bar code derived data onto a transparent label with invisible ink, said label being smaller than said document; and c) applying the thus printed transparent label to the document.

3. The method of claim 2 further including the step of encoding data derived from scanning the document and printing encoded data on the transparent label with invisible ink.

4. The method of claim 2 wherein ink visible in the infra-red region is applied to the transparent label.

5. The method of claim 2 wherein ink visible in the ultra violet region is applied to the transparent label.

* * * * *